Patented Oct. 13, 1936

2,056,945

UNITED STATES PATENT OFFICE 2,056,945

AROMATIC MERCURY ALCOHOLATES OF HYDROXY FATTY COMPOUNDS

Carl N. Andersen, Watertown, Mass., assignor to Lever Brothers Company, a corporation of Maine No Drawing. Application December 7, 1934, Serial No. 756,475

5 Claims. (Cl. 260—13)

The present invention relates to the production of certain new organic mercury compounds, particularly aromatic mercury alcoholates of hydroxy fatty compounds.

It is an object of my invention to produce new organic mercury compounds useful as germicides and for other therapeutic purposes.

I have discovered that when a hydrogen atom of the hydroxyl group in fat compounds is replaced by the essential radical of certain aromatic mercury compounds, compounds are produced which have extraordinarily high potency as antiseptics and germicides, and at the same time are characterized by relatively low toxicity and other desirable properties.

The compounds constituting the subject-matter of the present invention may be described as having the general formula $RHg.R_1$ in which R represents an aromatic structure, to a carbon atom of which the mercury is directly attached; and in which $R_1$ represents a radical corresponding to a fat compound containing a hydroxyl group, which radical is linked to the RHg group through the replacement of the hydroxyl hydrogen atom.

More particularly, R represents an aromatic structure, which may be an aromatic nucleus with or without side chains, and the expression "aromatic structure" used herein is intended to be generic and include an aromatic nucleus with or without side chains. The aromatic structure is of the type in which none of the nuclear or side chain carbon atoms has direct linkage with any element other than hydrogen, carbon or mercury. R may stand for the phenyl group, $C_6H_5$, or for an aromatic hydrocarbon having a nucleus similar to the phenyl hydrocarbons, as for example, polycyclic hydrocarbons, in which all of the nuclear carbon atoms, other than the one attached to mercury, and any side chain carbon atoms, have their valences satisfied either by carbon or hydrogen. Examples are the diphenyl, tolyl, xylyl and naphthyl groups.

By the expression "hydroxy fatty compound" I intend to include fatty compounds containing a free hydroxyl group. This includes alcohols which are found in waxes or prepared synthetically, such as the higher fat alcohols of the saturated series, for example, cetyl and myricyl alcohols; as well as the unsaturated fat alcohols, for example, oleic alcohol, which are produced by reducing a fat acid or other fatty material to yield the corresponding alcohol; and the salts of hydroxy fatty acids, for example: sodium ricinoleate.

Examples of the aromatic mercury derivatives of the compounds in this group are:

Aromatic mercury derivative of cetyl alcohol, $C_{16}H_{33}OHgR$; aromatic mercury derivative of myricyl alcohol, $C_{26}H_{53}OHgR$; aromatic mercury derivative of oleic alcohol, $C_{18}H_{33}OHgR$; aromatic mercury derivative of sodium ricinoleate, $C_6H_{13}CH(OHgR)CH_2CH:CH(CH_2)_7COONa$.

I have prepared organic mercury alcoholates from a sufficiently representative number of the hydroxy fatty compounds to lead me to believe that all of the compounds of this type can be employed to produce my novel mercury compounds. The compounds so prepared have, in greater or lesser, but always in relatively high degree, desirable antiseptic and germicidal properties. I, therefore, regard my invention as generic to and including the entire group of these fat compounds.

The compounds may be prepared in various ways. The following examples are given as illustrative of the methods by which all the compounds of this series may be prepared, and as illustrative of representative organic mercury derivatives of fat compounds falling within the scope of my invention:

Example 1

17.64 grams of phenylmercury hydroxide is dissolved in 1 liter of alcohol and heated to boiling. All of the material goes into solution. To this solution is added 15.69 grams of oleic alcohol. The mixture is refluxed on a steam bath for about an hour and then filtered. The filtrate is allowed to cool and waxy crystals separate. After the mixture has stood for some time the crystals are separated by filtration, washed well with a few cc. of alcohol and dried in a vacuum desiccator. The resulting material begins to melt at 102° C. and does not completely melt until 131° C. The compound is phenylmercury oleic alcoholate.

Example 2

17.64 grams of phenylmercury hydroxide is dissolved in 2 liters of water and heated until solution is complete. The solution is filtered to remove any foreign or insoluble material. To the filtrate is added a solution of 100 cc. of alcohol containing 14.28 grams of sodium ricinoleate. A soapy white solution results when the compounds react. The mixture is concentrated to two-thirds of its original volume and allowed to cool. On standing, white crystals separate which may be removed by filtration and washed well with water and alcohol and dried. They have a melting point of 62-63° C. The compound is the phenylmercury alcoholate of sodium ricinoleate.

The reacting materials are employed in substantially theoretical quantities. In some cases, if it is desired, approximately 10% excess of the fat compound is employed in order to insure complete conversion of the aromatic mercury compound.

Any suitable solvent in which the reacting components are soluble may be used as the medium for carrying out the reaction. If the reacting components are soluble therein, water is generally used for reasons of convenience, but as this is generally not the case with the fat compounds, other solvents which do not affect or enter into the reaction may be employed. Examples are, the lower alcohols, acetone and other organic solvents which may be used alone or in a mixture with each other or with water.

The process may be carried out at any temperature, for example, room temperature. In most cases I find, however, that the use of heat facilitates the solution of the reacting components and speeds the reaction.

From the description of the above examples it will be readily apparent to one skilled in the art how the other members of this group of fat compounds may be reacted with an aromatic mercury compound to produce an alcoholate of analogous structure.

In the examples, the method employed has the advantage that the only by-product of reaction is water and the compound is easily purified.

All of the compounds produced as above described are characterized by extraordinarily high potency as germicides. Tests to determine the efficacy of some of them in killing B. typhosus and Staph. aureus were carried on under the following conditions:

Aqueous solutions of varying dilutions from 1:10,000 upward until killing ceased, were made up.

These dilutions were employed in the conduct of the tests by the following methods:

Circular 198, U. S. Dept. of Agriculture, Dec. 1931, described as F. D. A. method against Eberthella typhi (typhoid bacillus) at 37° C. and F. D. A. special method against Staph. aureus at 37° C.

As illustrative of the potency of the compounds, the killing power of the following compound is given merely as illustrative.

The figures represent the maximum dilutions at which killing in 15 minutes resulted:

|  | B. typhosus | Staph. aureus |
| --- | --- | --- |
| Phenylmercury alcoholate of sodium ricinoleate | 1:65,000 | 1:20,000 |

In addition to their high germicidal value, all of these compounds are characterized by relatively low toxicity. Because of these properties it is possible to use them in extreme dilutions and in many situations where known germicides, because of toxic or other undesired properties, cannot be employed. They may be used externally and locally, and in some cases administered internally with satisfactory results from the germicidal standpoint and without harmful effect to the body or its functions.

The compounds retain their germicidal activity when incorporated in soap and various menstruums employed in preparing germicidal compositions.

When these new compounds are to be used directly as germicides they may be employed in aqueous or other solutions or they may be formed into various preparations such as mouth washes, tooth pastes, soaps, ointments, etc.

I claim:

1. A new organic mercury compound of the general formula $RHg.R_1$ in which R represents an aromatic structure to a carbon atom of which the mercury is directly attached and in which none of the carbon atoms has direct linkage with any element other than hydrogen, carbon and mercury; and in which $R_1$ represents a radical corresponding to a hydroxy fatty compound, which radical is linked to the RHg group through replacement of the hydroxyl hydrogen atom.

2. A new organic mercury compound of the general formula $RHg.R_1$ in which R represents an aromatic structure to a carbon atom of which the mercury is directly attached and in which none of the carbon atoms has direct linkage with any element other than hydrogen, carbon and mercury; and in which $R_1$ represents a fat alcohol radical that is linked to the RHg group through the replacement of a hydroxyl hydrogen atom.

3. A new organic compound of the general formula $C_6H_5Hg.R_1$, in which $R_1$ represents a radical corresponding to a hydroxy fatty compound, which radical is linked to the $C_6H_5Hg$ group through the replacement of the hydroxyl hydrogen atom.

4. A phenylmercury alcoholate of a higher fat alcohol.

5. Phenylmercury oleic alcoholate.

CARL N. ANDERSEN.